(12) United States Patent
Ueda (10) Patent No.: US 8,972,634 B2
(45) Date of Patent: Mar. 3, 2015

(54) STORAGE SYSTEM AND DATA TRANSFER METHOD

(71) Applicant: Fujitsu Limited, Kawasaki-shi, Kanagawa (JP)

(72) Inventor: Akihiro Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 13/921,534

(22) Filed: Jun. 19, 2013

(65) Prior Publication Data

US 2014/0040581 A1 Feb. 6, 2014

(30) Foreign Application Priority Data

Aug. 2, 2012 (JP) ................. 2012-172251

(51) Int. Cl.
*G06F 3/00* (2006.01)
*G06F 13/00* (2006.01)
*G06F 3/06* (2006.01)

(52) U.S. Cl.
CPC .............. *G06F 3/065* (2013.01); *G06F 3/0608* (2013.01); *G06F 3/067* (2013.01); *G06F 3/0605* (2013.01)
USPC .............................................. 710/62; 710/36

(58) Field of Classification Search
None
See application file for complete search history.

(56) References Cited

U.S. PATENT DOCUMENTS

| | | | | |
|---|---|---|---|---|
| 7,602,392 B2 * | 10/2009 | Nagao et al. | .................. | 345/501 |
| 2004/0088379 A1 | 5/2004 | Aoshima et al. | | |
| 2006/0212668 A1 | 9/2006 | Furukawa et al. | | |

FOREIGN PATENT DOCUMENTS

| | | |
|---|---|---|
| JP | 2004-157637 | 6/2004 |
| JP | 2006-260292 | 9/2006 |

* cited by examiner

*Primary Examiner* — Zachary K Huson
(74) *Attorney, Agent, or Firm* — Staas & Halsey LLP (57) ABSTRACT

A storage system includes: a storage device configured to copy data to another storage device, the storage device includes: a first storage region configured to store the data; a first receiving unit configured to receive a first instruction from a higher level device; a transferring unit configured to transfer the instruction from the higher level device to the another storage device; and a first storage region releasing unit configured to release the first storage region, wherein, when the first instruction is a releasing instruction instructing to release the first storage region, the transferring unit transfers the releasing instruction to the another storage device before releasing of the first storage region is completed by the first storage region releasing unit.

12 Claims, 7 Drawing Sheets

STORAGE SYSTEM AND DATA TRANSFER METHOD

CROSS-REFERENCE TO RELATED APPLICATION

This application is based upon and claims the benefit of priority from the prior Japanese Patent Application No. 2012-172251 filed on Aug. 2, 2012, the entire contents of which are incorporated herein by reference.

FIELD

The embodiments discussed herein are related to storage devices and storage systems.

BACKGROUND

A storage device includes a plurality of storages. One storage (work storage) makes a copy of itself in another storage (back up storage) and thereby backs itself up. Among a plurality of storage devices arranged in locations that are remote from each other, one of the storage devices has a remote copying function of copying the data of the one storage device to another storage device.

An example of the related art is disclosed in Japanese Laid-open Patent Publication No. 2006-260292.

SUMMARY

According to an aspect of the invention, a storage system includes: a storage device configured to copy data to another storage device, the storage device includes: a first storage region configured to store the data; a first receiving unit configured to receive a first instruction from a higher level device; a transferring unit configured to transfer the instruction from the higher level device to the another storage device; and a first storage region releasing unit configured to release the first storage region, wherein, when the first instruction is a releasing instruction instructing to release the first storage region, the transferring unit transfers the releasing instruction to the another storage device before releasing of the first storage region is completed by the first storage region releasing unit.

The object and advantages of the invention will be realized and attained by means of the elements and combinations particularly pointed out in the claims.

It is to be understood that both the foregoing general description and the following detailed description are examples and explanatory and are not restrictive of the invention, as claimed.

DESCRIPTION OF EMBODIMENT

A storage device is employed that includes a redundant array of disks (RAID) to which a thin provisioning function has been added in order to reduce the amount of a storage region that is occupied and to reduce administrative expenses. In the thin provisioning function, the capacity of a volume in a storage system that is visible to a higher level device such as a server is virtualized by letting the server see a capacity that is equal to or greater than the capacity of the physical volume.

When a logical unit number (LUN) newly created in a storage device when the capacity of the storage is expanded is to be allowed to be recognized on the higher level device side, the operating system (OS) is restarted and, for example, service is halted on the higher level device side. When the thin provisioning function is used, the size of a LUN may appear to be larger to the OS than it really is. Consequently, when the percentage of use of the LUN has increased, the physical disk space is expanded inside the storage device without halting provision of service. The physical disk capacity is expanded without the OS side being affected. The thin provisioning function has excellent expandability.

Volume secured by the thin provisioning function may be called thin provisioning volume (TPV). When a host device accesses a TPV, the physical disk capacity is sequentially allocated. For example, although a file within a TPV deleted by the host device is not used by the OS, the physical disk capacity in the storage device allocated to the file may still remain.

In order to release remaining unused physical disk capacity, for example, an UNMAP command is used, which is a command of the SCSI standards, which are used in vStorage APIs for Array Integration (VAAI), which is a storage application program interface (API) provided by VMware. An UNMAP command from the host device instructs releasing of unused physical disk capacity in a TPV within a storage device. When a file is deleted from the OS, an UNMAP command is also issued to the storage device and as a result thin provisioning operation is performed with very high efficiency.

Some storage systems may support use of an UNMAP command for a region in which a session of an advanced copy function is being executed. In an advanced copy function, the storage device side independently makes a copy at high speed without involvement of the CPU of the host device. For example, the data of a copy source volume at a certain time is copied to another volume in a short time.

Examples of an advanced copy function include an equivalent copy (EC) function in which creation of a copy is usually synchronized with updating of the copy source volume, and a one point copy (OPC) function in which copy of the entirety of the copy source volume is created at a certain time. An example of OPC is quick OPC. In quick OPC, first, all the data of the copy source volume is copied to the copy destination volume, and after that only data of updated portions, for example, data that is different, is copied to the copy destination volume.

Figure 1:
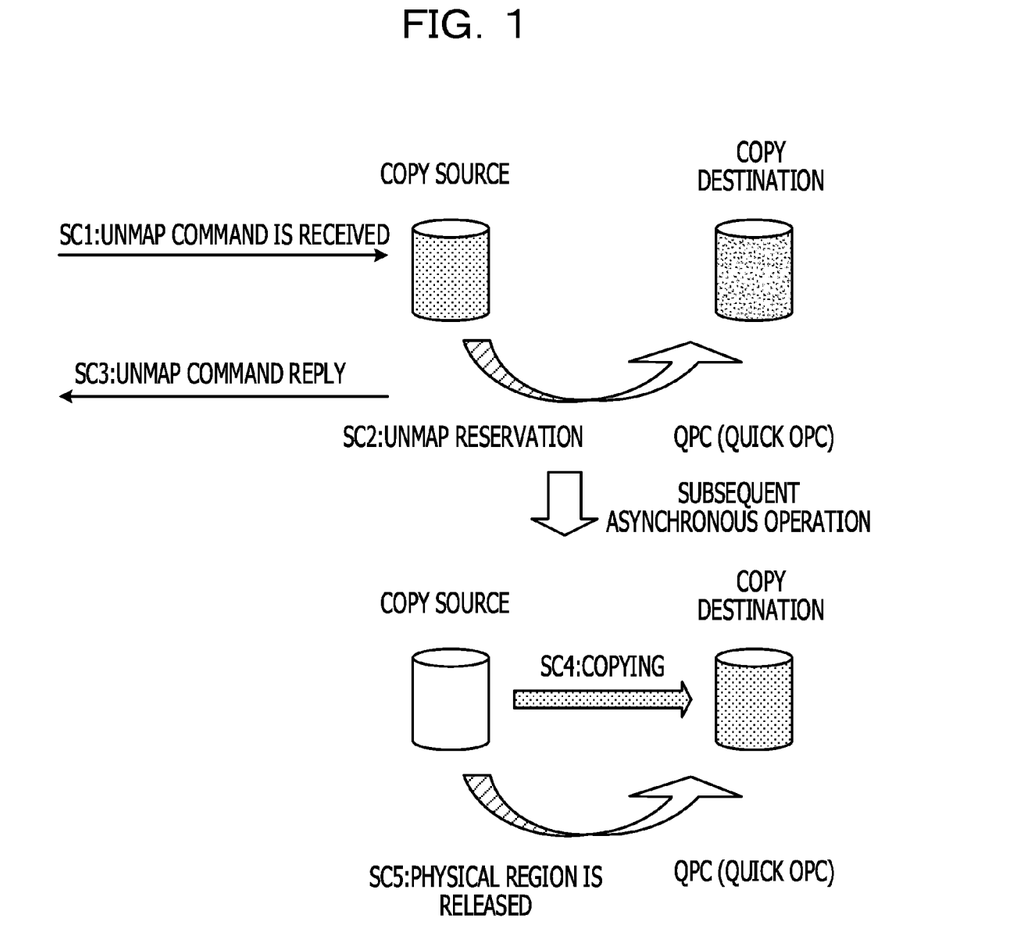
FIG. 1 illustrates an example of a Quick OP session.

FIG. 1 illustrates an example of a Quick OP session. In FIG. 1, an UNMAP command is issued for a region of a copy source volume for which a Quick OP session is being executed. In an operation SC1, a copy source device, which includes a region for which copying of the Quick OPC session is not yet completed, receives an UNMAP command from a host device, which is not illustrated. Data that has not yet been copied has to be copied to the copy destination volume, but releasing of the physical region by unmapping is not synchronized with the UNMAP command. Accordingly, in an operation SC2, the copy source volume makes an UNMAP reservation.

Figure 2:
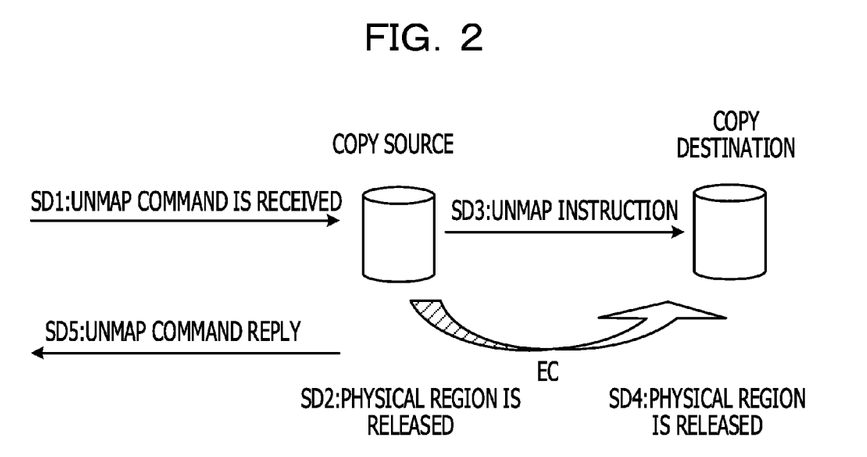
FIG. 2 illustrates an example of an EC session.

In an operation SC3, the copy source device returns an UNMAP command reply to the host device. Copying is asynchronously performed in an operation SC4 and after completion of the copying, the physical region is asynchronously released in an operation SC5. FIG. 2 illustrates an example of an EC session. In FIG. 2, an UNMAP command is issued for a region of the copy source volume for which the EC session is being executed.

In an EC session SD1, the copy source device, which includes a region for which copying of the EC session is not yet complete, receives an UNMAP command from the host device. In an EC session SD2, the physical region of the copy source volume is released. In an EC session SD3, an UNMAP instruction is output to the copy destination volume from the copy source volume.

In an EC session SD4, the physical region of the copy destination volume is released. In an EC session SD5, the copy source volume returns an UNMAP command reply to the host device.

In inter-device synchronous replication (remote equivalent copy (REC)), copying is performed from the copy source volume to the copy destination volume within different devices. An example of a REC transfer mode is a consistency mode in which the order of data mirroring in a plurality of synchronous processing operations is secured. However, in the REC consistency mode, an UNMAP command instruction may not be issued to the copy destination volume from the copy source volume.

If the processing to release the physical region of the copy source volume or the copy destination volume takes some time, REC buffer HALT in which the REC buffer overflows may occur without the REC buffer being released. Consequently, the REC session may be abnormally halted. In a volume having a REC consistency mode session, an UNMAP command may not be processed.

Figure 3:
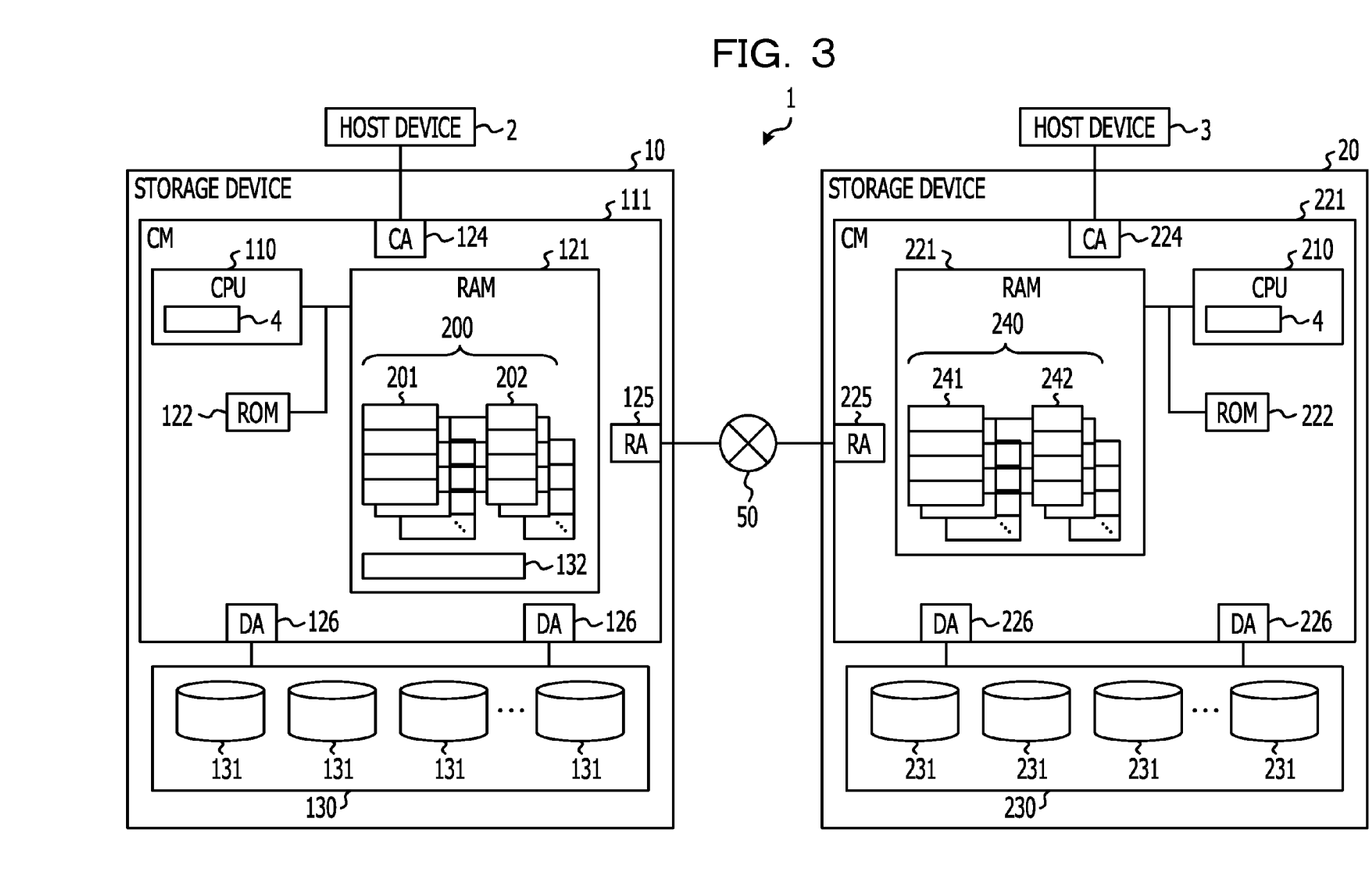
FIG. 3 illustrates an example of a storage system.

FIG. 3 illustrates an example of a storage system.

In a storage system 1 illustrated in FIG. 3, a plurality, for example two, storage devices 10 and 20 are connected with each other so as to be capable of communicating with each other via a remote line, for example, a communication line 50. The storage devices 10 and 20 respectively include information processing devices (controller modules (CMs)) 111 and 211.

A host device 2, which is for example a higher level device, is connected to the storage device 10. A host device 3, which is for example a higher level device, is connected to the storage device 20. The host devices 2 and 3 write data into and read data from volumes of the storage devices 10 and 20 connected thereto. For example, the host device 2 requests read and write data access to volumes 131 of the storage device 10. The storage device 10 performs data access to the volumes 131 in accordance with the data access request and replies to the host device 2.

The host devices 2 and 3 may be computers including an information processing device, for example, a central processing unit (CPU), a random access memory (RAM), a read only memory (ROM) and so forth. The host device 2 issues for example an UNMAP command and a Write command to the storage device 10.

The host device 2, for example, specifies a session ID, a copy source logical unit number (LUN) and a start logical block address (LBA), or a copy destination LUN and a start LBA and block count (BC). The storage system 1 copies data of volumes of the storage device 10, for example, data of logical volumes to the other storage device 20.

For example, the storage device 10 may be a copy source device and the storage device 20 may be a copy destination device. Data of disk devices 131 of the storage device 10 is copied to the storage device 20 and may be stored in disk devices 231 of the storage device 20. The volumes of the storage device 10 may be referred to a migration source volumes #00 and the volumes of the storage device 20 may be referred to as migration destination volumes #10. Data transfer between the storage device 10 and the storage device 20 via the remote line 50 may be referred to as remote transfer.

The remote line 50 may be a communication line connected so as to be capable of communicating data and transfers data in accordance with a standard such as TCP/IP. The storage devices 10 and 20 provide a storage region for the host device 2 or 3, and for example may be RAID devices. In FIG. 3, the host device 2 is connected to the storage device 10 and the host device 3 is connected to the storage device 20. For example, two or more host devices may be connected to each of the storage devices 10 and 20.

The storage devices 10 and 20 may be storage devices that perform copying in a REC consistency mode. The storage devices 10 and 20, as illustrated in FIG. 3, respectively include CMs 111 and 211 and disk enclosures 130 and 230. The CMs 111 and 211 respectively perform various control operations on the storage devices 10 and 20. An access control operation or another control operation may be performed on the disk devices 131 and 231 of the disk enclosures 130 and 230 in accordance with a storage access request, for example, an access control signal, from the host devices 2 and 3 corresponding to higher level devices.

The disk enclosures 130 and 230 respectively include one or more disk devices 131 and 231. The disk devices 131 and 231, for example, may be hard disk drives (HDDs). In the storage devices 10 and 20, storage regions of the HDDs 131 and 231 are allocated to logical volumes. The CMs 111 and 211 respectively include channel adapters (CAs) 124 and 224, remote adapters (RAs) 125 and 225, CPUs 110 and 210, ROMs 122 and 222 and RAMs 121 and 221. In FIG. 3, one CM 111 or 211 is provided in each of the storage devices 10 and 20, but two or more CMs 111 or 211 may be provided.

The CAs 124 and 224 may be interface controllers that are respectively connected to the host devices 2 and 3 so as to be capable of communicating therewith and for example may be fiber channel adapters. The RAs 125 and 225 may be interface controllers that are respectively connected to the other storage device 20 or 10 via the remote line 50 so as to be capable of communicating therewith and for example may be fiber channel adapters.

The RAMs 121 and 221 may be memories (storage regions) in which data and programs are temporarily stored. For example, data to be transmitted to the other storage device 20 or 10 is temporarily stored in a predetermined region of the RAM 121 or 221, and the RAMs 121 and 221 may function as REC buffers 200 and 240. The REC buffers 200 and 240 secure the order of data reading and writing processing and therefore may be managed by being divided into a plurality of regions. The individual divided regions may be managed as generations. The generations may be managed in chronological order. Each generation may be released once copying processing between the storage devices 10 and 20 is completed. In the releasing, a generation becomes available for storing data.

The REC buffers 200 and 240 respectively include control data sections 201 and 241 that store commands (instructions) such as UNMAP and COPY commands and data sections 202 and 242 that store data content corresponding to the instructions within the control data sections 201 and 241. At the time of remote transfer, the RAMs 121 and 221 may function as transfer data buffers that temporarily store data to be transferred to the other storage device 20 or 10.

In other predetermined regions of the RAMs 121 and 221, data received from the host device 2 or 3 and data to be transmitted to the host device 2 or 3 is temporarily stored and the RAMs 121 and 221 may also thereby serve as buffer memories. In other predetermined regions of the RAMs 121 and 221, data and programs may be temporarily stored and expanded when the CPU 110 or 210 executes a program.

In another predetermined region of the RAM 121, a copy bitmap 132 may be stored. The copy bitmap 132 may be a bitmap used for managing progress and results of copying when copying is performed between devices, for example, between the storage device 10 and the storage device 20. The copy bitmap 132 manages whether or not copying of regions of a predetermined size in the storage devices 10 and 20 are to be copied using one bit values. In one bit, a value "1" is set when copying of the corresponding region is to be performed and a value "0" is set when copying of the corresponding region is not to be performed.

For example, when a volume having a size of 8 MB is to be copied, bits are assigned to the entire volume and therefore 1024 bits are prepared and a copy bitmap 132 of 1024/8=128 bytes is prepared. The ROMs 122 and 222 may be storage units that store programs executed by the CPU 110 or 210 and various kinds of data.

Figure 4:
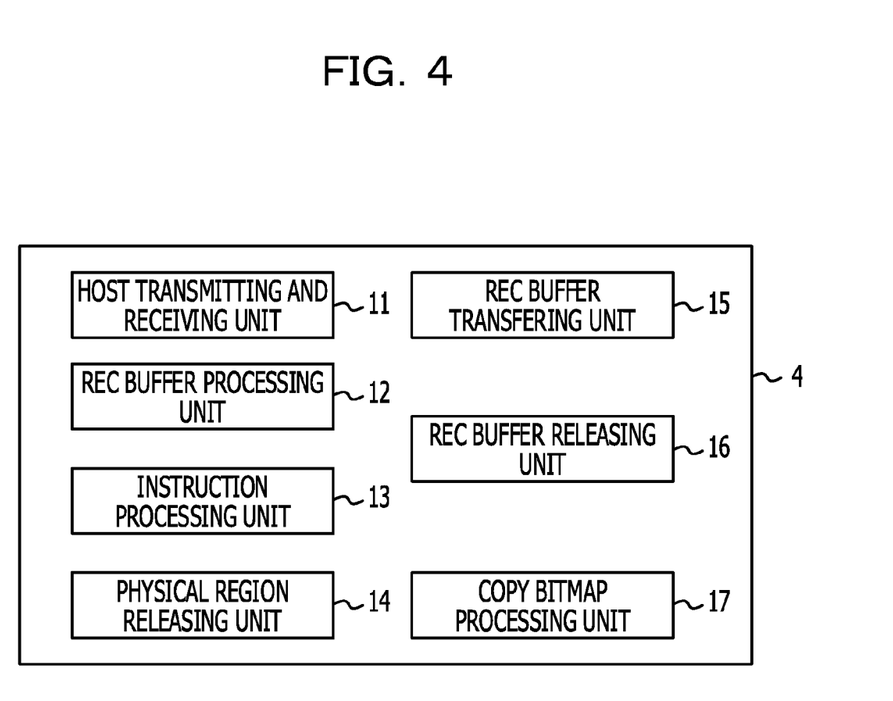
FIG. 4 illustrates an example of a processing unit.

The CPUs 110 and 210 may be processing devices that perform control and calculation and realize various functions by executing programs stored in the ROMs 122 and 222. For example, the CPUs 110 and 210, as illustrated in FIG. 3, may function as processing units 4. FIG. 4 illustrates an example of a processing unit.

The processing units 4 illustrated in FIG. 4 each include a host transmitting and receiving unit 11, a REC buffer processing unit 12, an instruction processing unit 13, a physical region releasing unit 14, a REC buffer transferring unit 15, a REC buffer releasing unit 16 and a copy bitmap processing unit 17. The host transmitting and receiving unit (receiving unit) 11 performs transmission and reception of commands and data to and from the host device 2 or 3.

The REC buffer processing unit 12, along with creating the REC buffer 200 or 240 and managing generations, stores and outputs instructions and data to and from the REC buffer 200 or 240. The instruction processing unit 13 executes commands (instructions) for example Write and Read commands for the volumes 131 or 231.

The physical region releasing unit 14 releases a thin provisioning volume physical region specified by an UNMAP command. The REC buffer transferring unit 15 transfers content of the REC buffer 200 or 240 to the storage device 10 or 20. The REC buffer releasing unit 16 releases the REC buffer 200 or 240.

In a case where a REC path blockage and a REC buffer HALT have occurred before completion of the processing to release the physical region, the copy bitmap processing unit 17 transfers an UNMAP target region of the copy source to the copy bitmap 132. A program that executes functions of the host transmitting and receiving unit 11, REC buffer processing unit 12, instruction processing unit 13, physical region releasing unit 14, REC buffer transferring unit 15, REC buffer releasing unit 16 and copy bitmap processing unit 17 may be supplied by being recorded on a computer-readable recording medium such as a flexible disk, a CD (CD-ROM, CD-R, CD-RW etc.), a DVD (DVD-ROM, DVD-RAM, DVD-R, DVD+R, DVD-RW, DVD+RW, HDDVD etc.) a Blu-ray disk, a magnetic disk, an optical disk or a magneto-optical disk. The computer reads the program from the recording medium and stores the program by transferring it to an internal storage unit or an external storage unit. The program is recorded on a storage unit (recording medium) such as a magnetic disk, an optical disc or a magneto-optical disk and the program may be supplied to the computer via a communication path from the storage unit.

When the functions of the host transmitting and receiving unit 11, REC buffer processing unit 12, instruction processing unit 13, physical region releasing unit 14, REC buffer transferring unit 15, REC buffer releasing unit 16 and copy bitmap processing unit 17 are executed, the program stored in an internal storage unit, for example, the RAMs 121 and 221 or the ROMs 122 and 222 may be executed by the microprocessor of a computer, for example, the CPU 110 or 210. The program recorded on the recording medium may be read out and executed by the computer.

The computer may include hardware and an OS or may be hardware operating under control of an OS. When an application program causes hardware to operate independently without the OS, the hardware itself may correspond to a computer. The hardware may at least include a microprocessor such as a CPU and a unit for reading the computer program recorded on the recording medium. The CMs 111 and 211 may function as computers.

Figure 5:
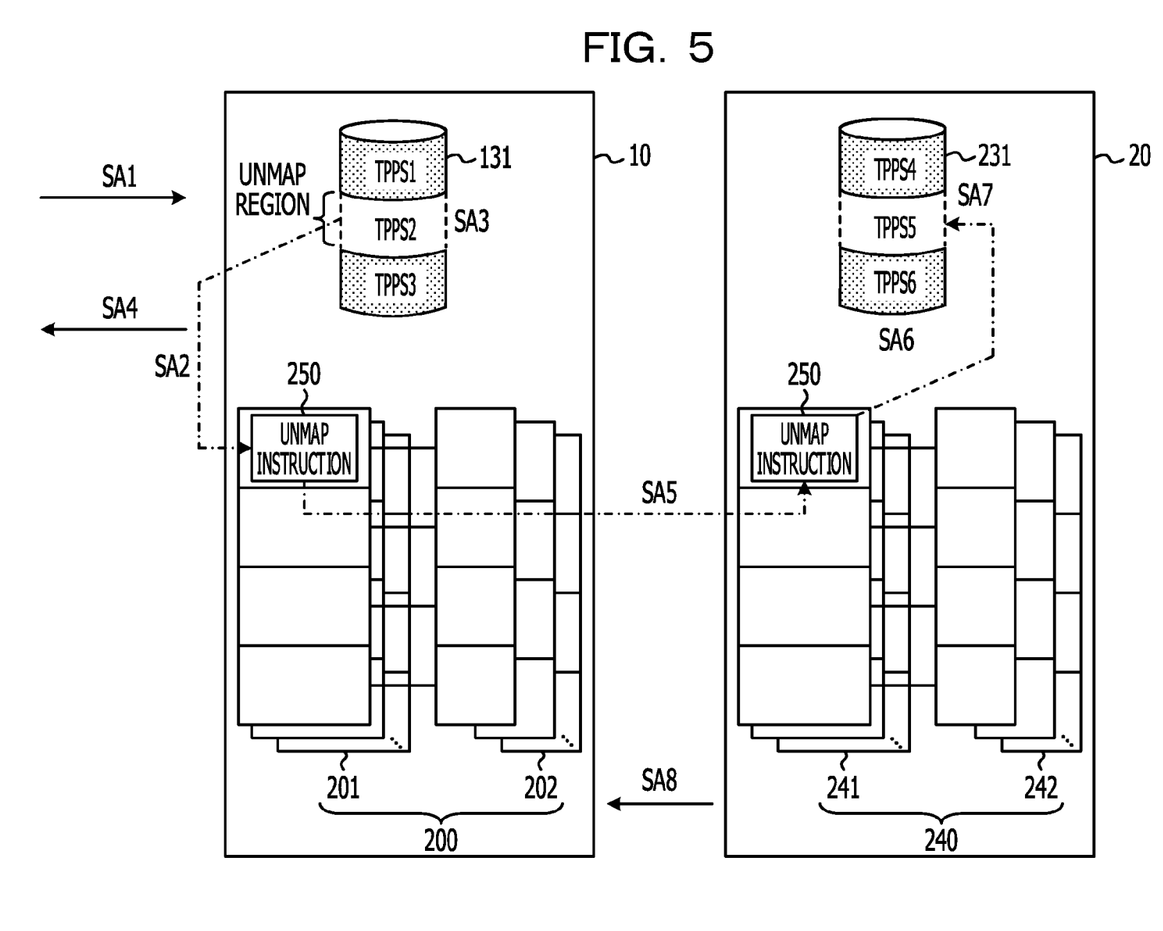
FIG. 5 illustrates an example of processing of an UNMAP command.

FIG. 5 illustrates an example of processing of an UNMAP command. In FIG. 5, processing of an UNMAP command in the storage system 1 illustrated in FIG. 3 is illustrated.

In an operation SA1, the host transmitting and receiving unit 11 of the copy source device 10 receives an UNMAP command from the host device 2. In operation SA2, the REC buffer processing unit 12 of the copy source device 10 stores an UNMAP instruction 250 in a control data section 201 of the REC buffer 200 and may also store an OLUN, LBA or BC, which are UNMAP targets.

In an operation SA3, the physical region releasing unit 14 of the copy source device 10 releases a physical region TPPS2, which is an UNMAP target, of the copy source volume #00. In an operation SA4, the host transmitting and receiving unit 11 of the copy source device 10 returns a reply to the UNMAP command received in the operation SA1 to the host device 2. In an operation SA5, the REC buffer processing unit 12 of the copy source device 10 performs REC buffer transfer, for example, transfers only control data from the REC buffer 200 of the copy source device 10 to the REC buffer 240 of the copy destination device 20. The operation SA5 may be performed asynchronously with the operation SA3. The REC buffer transferring unit 15 of the copy source device 10 instructs the copy source device 10 to release the physical region via REC buffer transfer before releasing of the physical region TPPS2 of the copy source device 10 is finished. Once the releasing of the physical region of the copy source device 10 is complete, REC buffer transfer may not be performed.

In operation SA6, the instruction processing unit 13 of the copy destination device 20 executes UNMAP processing for the copy destination volume #01 and, in operation SA7, the physical region releasing unit 14 of the copy destination device 20 releases the physical region TPPS5, which is the UNMAP target, of the copy destination volume #01. In an operation SA8, a REC buffer releasing instruction is issued from the REC buffer transferring unit 15 of the copy destination device 20 to the copy source device 10. The operation SA8 may be performed asynchronously with the operation SA7. The REC buffer releasing unit 16 of the copy destination device 20 outputs a REC buffer release notification to the copy source device 10 before releasing of the physical region TPPS5 of the copy destination device 20 is finished. Once updating of the copy destination device 20 is complete, issuing of a REC buffer releasing notification may not be performed.

Figure 6:
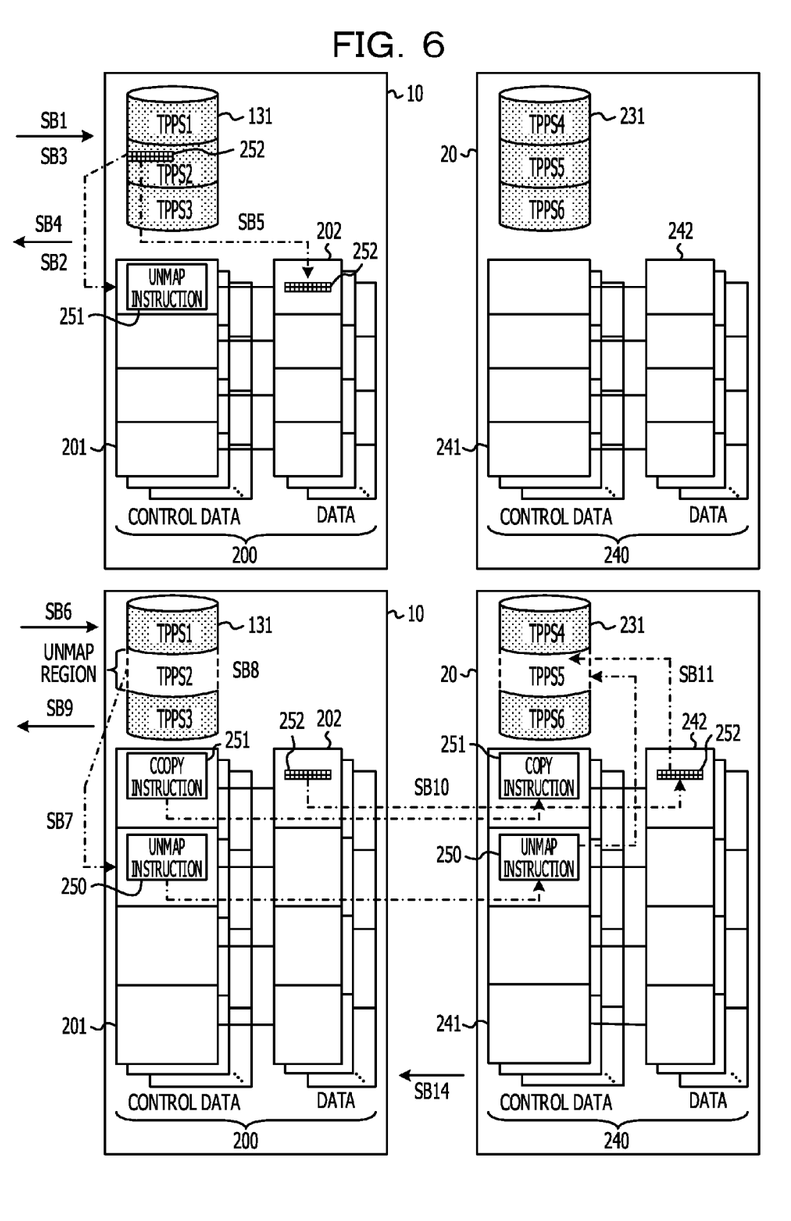
FIG. 6 illustrates an example of processing of an UNMAP command and a Write command.

FIG. 6 illustrates an example of processing of an UNMAP command and a Write command. In FIG. 6, for example, both an UNMAP command and a Write command are issued in the storage system illustrated in FIG. 3. In an operation SB1, the host transmitting and receiving unit 11 of the copy source device 10 receives a Write command from the host device 2.

In an operation SB2, the REC buffer processing unit 12 of the copy source device 10 stores a Write instruction 250 in a control data section 201 of the REC buffer 200. At that time, the OLUN, LBA or BC etc of the region to be subjected to writing, may also be stored. In an operation SB3, the REC buffer transferring unit 15 of the copy source device 10 writes data, which is the target of writing, into the copy source volume #00.

In an operation SB4, the host transmitting and receiving unit 11 of the copy source device 10 returns a reply to the host device 2 to the Write command received in the operation SB1, and in operation SB5, the REC buffer processing unit 12 of the copy source device 10 stores data 252 specified as a target of writing by the Write command in a data section 202 of the REC buffer 200. The operation SB5 may be performed asynchronously with the operation SB4.

In an operation SB6, the host transmitting and receiving unit 11 of the copy source device 10 receives an UNMAP command from the host device 2. In an operation SB7, the REC buffer processing unit 12 of the copy source device 10 stores the UNMAP instruction 250 in a control data section 201 of the REC buffer 200. OLUN, LBA or BC etc., which are UNMAP targets, may also be stored.

In an operation SB8, the physical region releasing unit 14 of the copy source device 10 releases a physical region TPPS2 which is the UNMAP target of the copy source volume #00. In an operation SB9, the host transmitting and receiving unit 11 of the copy source device 10 returns a reply to the UNMAP command received in the operation SB6 to the host device 2. In an operation SB10, the REC buffer processing unit 12 of the copy source device 10 performs REC buffer transfer, for example, transfers control data and data from the REC buffer 200 of the copy source device 10 to the REC buffer 240 of the copy destination device 20. The operation SB10 may be performed asynchronously with operation SB8. The REC buffer transferring unit 15 of the copy source device 10 instructs the copy source device 10 to release the physical region via REC buffer transfer before releasing of the physical region TPPS2 of the copy source device TPPS2 is completed. Once the releasing of the physical region of the copy source device 10 is complete, REC buffer transfer may not be performed.

In an operation SB11, in the copy source device 10, the UNMAP instruction 250 and the copy instruction 251 exist in the same generation in the REC buffer 200, the targets of the two instructions are the same region and it is determined whether the COPY instruction 251 has chronological precedence. In FIG. 6, the determination is YES, and therefore the instruction processing unit 13 of the copy destination device 20 skips expanding the data 252 in the copy destination volume #01. In accordance with the UNMAP instruction 250, since the physical region of the target is to be released thereafter, copying is not performed and expansion of the data 252 is skipped.

In an operation SB12, the instruction processing unit 13 of the copy destination device 20 executes UNMAP processing for the copy destination volume #01. In an operation SB13, the physical region releasing unit 14 of the copy destination device 20 releases a physical region TPPS5, which is the UNMAP target, of the copy destination volume #01. In an operation SB14, a REC buffer releasing instruction is issued from the REC buffer transferring unit 15 of the copy destination device 20 to the copy source device 10. The operation SB13 may be performed asynchronously with operation SB14. For example, the REC buffer releasing unit 16 of the copy destination device 20 outputs a REC buffer release notification to the copy source device 10 before releasing of the physical region TPPS5 of the copy destination device 20 is finished. Once updating of the copy destination device 20 is complete, issuing of a REC buffer releasing notification may not be performed.

Figure 7:
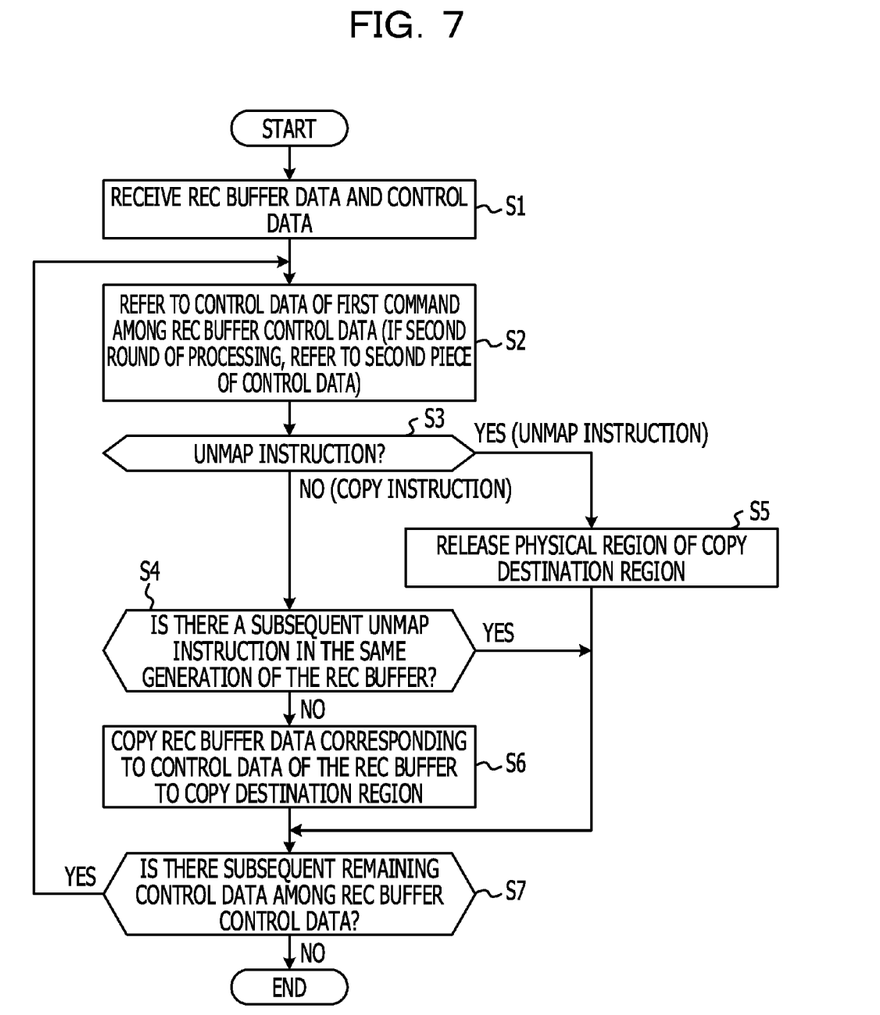
FIG. 7 illustrates an example of processing for a copy destination device.

Regions in which there are non-matching portions between the copy source and the copy destination may be copied one more time by performing write back to the copy bitmap 132 without performing UNMAP processing. FIG. 7 illustrates an example of processing for a copy destination device. In FIG. 7, processing of the copy destination device 20 in the storage system 1 illustrated in FIG. 3 is illustrated.

In an operation S1, the REC buffer processing unit 12 of the copy destination device 20 receives an instruction and data in the data section 242 and the control data section 241 of the REC buffer 240 via REC buffer transfer. This processing may correspond to the operation SB10 illustrated in FIG. 6. In an operation S2, the REC buffer processing unit 12 of the copy destination device 20 reads out the control data at the head of the control data section 241 of the REC buffer 240 received in the operation S1. In FIG. 6, the COPY instruction is stored in the control data at the head of the control data section 241 of the REC buffer 240.

In an operation S3, the instruction processing unit 13 of the copy destination device 20 determines whether the instruction read out from the control data section 201 of the REC buffer 200 in the operation S2 is the UNMAP instruction 250. In FIG. 6, the read out instruction is a COPY instruction, so the result of the determination is NO. In the case where the instruction is the COPY instruction 251 (refer to NO (COPY instruction) route of the operation S3), in an operation S4, the copy destination device 20 determines whether the UNMAP instruction 250 is stored next in the same generation of the REC buffer 200. In FIG. 6, the UNMAP instruction 250 exists next in the same generation of the REC buffer 200 and therefore the result of the determination is YES.

In the case where the instruction is the UNMAP instruction 250 in the operation S3 (refer to YES (UNMAP instruction) route of operation S3), in an operation S5, the copy destination device 20 releases the physical region of the copy destination device 20. Execution of the copy instruction in an operation S6 (expansion of data) is skipped and the processing proceeds to an operation S7. This processing may correspond to an operation SB11 illustrated in FIG. 6.

In the case where there is a subsequent UNMAP instruction 250 in the same generation of the REC buffer 200, (refer to YES route of operation S4), the processing proceeds to the operation S7. In the case where there is no subsequent UNMAP instruction 250 in the same generation of the REC buffer 200 (refer to NO route of operation S4), the processing proceeds to the operation S6. In the operation S6, the instruction processing unit 13 of the copy destination device 20 copies the data of the REC buffer data section 202 corresponding to the control data section 201 of the REC buffer 200 to the copy destination region.

In the operation S7, the copy destination device 20 determines whether there is remaining control data in the control data sections 201 of the REC buffer 200. In FIG. 6, since there is a remaining UNMAP execution instruction, the result of the determination may be YES. In the case where there is remaining control data in the control data sections 201 of the REC buffer 200 (YES route in operation S7), the processing returns to the operation S2. The remaining instruction is processed by repeating operations S2 to S7 (operations SB12 to SB14 illustrated in FIG. 6).

In the case where there is no control data in the control data section 201 of the REC buffer 200 (NO route of operation S7), the processing finishes. According to the storage system 1, the REC buffer transferring unit 15 of the copy source device 10 instructs the copy source device 10 to release the physical region via REC buffer transfer before releasing of the physical region TPPS2 of the copy source device 10 is finished. Accordingly, without waiting for updating of the copy source device 10 to finish, for example, REC buffer transfer is performed asynchronously and the speed of processing can be increased. The response time to the host device 10 may also be shortened.

The REC buffer releasing unit 16 of the copy destination device 20 outputs a REC buffer release notification to the copy source device 10 before releasing of the physical region TPPS5 of the copy destination device 20 is finished. Consequently, without waiting for updating of the copy destination device 20 to finish, for example, REC buffer releasing notification is asynchronously performed and occurrence of REC buffer overflow may be avoided.

In the case where a Write command and an UNMAP command simultaneously occur in the copy destination device 20, the instruction processing unit 13 of the copy destination device 20 skips execution of the Write command and therefore the speed of the processing may be increased. The response time to the host device 10 may also be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage system comprising:
a storage device configured to copy data to another storage device, the storage device includes:
a first storage region configured to store the data;
a first receiving unit configured to receive a first instruction from a higher level device;
a transferring unit configured to transfer the instruction from the higher level device to the another storage device; and
a first storage region releasing unit configured to release the first storage region,
wherein, when the first instruction is a releasing instruction instructing to release the first storage region, the transferring unit transfers the releasing instruction to the another storage device before releasing of the first storage region is completed by the first storage region releasing unit.

2. The storage system according to claim 1, wherein the another storage device is coupled to the storage device via a network.

3. The storage system according to claim 1, wherein the another storage device includes:
a second storage region configured to store the data;
a second receiving unit configured to receive in a buffer a second instruction;
an instruction processing unit configured to execute the second instruction;
a buffer releasing unit configured to release the buffer; and
a second storage region releasing unit configured to release the second storage region,
wherein, when the second instruction is a releasing instruction instructing releasing of the second storage region, the buffer releasing unit releases the buffer before releasing of the second storage region by the second storage region releasing unit is completed.

4. The storage system according to claim 3,
wherein, when the second instruction is an updating instruction instructing updating of the second storage region and an instruction that is subsequent to the updating instruction is a releasing instruction instructing releasing of the second storage region, the instruction processing unit ignores the updating instruction.

5. A storage system comprising:
a storage device configured to copy data from another storage device, the storage device includes:
a first storage region configured to store the data,
a first receiving unit configured to receiver in a buffer a first instruction from the another storage device,
an instruction processing unit configured to execute the instruction,
a buffer releasing unit configured to release the buffer, and
a first storage region releasing unit configured to release the storage region,
wherein, when the first instruction is a releasing instruction instructing releasing of the first storage region, the buffer releasing unit releases the buffer before releasing of the first storage region by the first storage region releasing unit is completed.

6. The storage system according to claim 5,
wherein, when the first instruction is an updating instruction instructing updating of the first storage region and an instruction that is subsequent to the updating instruction is a releasing instruction instructing releasing of the first storage region, the instruction processing unit ignores the updating instruction.

7. The storage system according to claim 5,
wherein the another storage device is coupled to the storage device via a network.

8. The storage system according to claim 5, wherein the another storage device includes:
a second storage region configured to store the data;
a second receiving unit configured to receive a second instruction from a higher level device;
a transferring unit configured to transfer the second instruction to the storage device; and
a second storage region releasing unit configured to release the second storage region,
wherein, when the second instruction is a releasing instruction instructing to release the second storage region, the transferring unit transfers the releasing instruction to the storage device before releasing of the second storage region is completed by the second storage region releasing unit.

9. A data transfer method for transmitting data from a storage device to another storage device, comprising:
receiving an instruction from a higher level device;
transferring the instruction to a buffer of the another storage device; and
releasing, when the instruction is a releasing instruction instructing releasing of a storage region of the storage device, the storage region and transferring the releasing instruction to the buffer of the another storage device before the releasing is completed.

10. The data transfer method according to claim 9, further comprising:
   receiving a plurality of instructions in the buffer; and
   releasing, when one of the plurality of instructions is a releasing instruction instructing releasing of the storage region, the storage region and releasing the buffer before the releasing of the storage region is completed.

11. A data transfer method for receiving data in a storage device from another storage device, comprising:
   receiving a plurality of instructions in a buffer from the another storage device; and
   releasing, when one of the plurality of instructions is a releasing instruction instructing releasing of a storage region of the another storage device, the storage region and releasing the buffer before the releasing of the storage region is completed.

12. The data transfer method according to claim 11, further comprising:
   receiving an instruction from a higher level device;
   transferring the instruction to the buffer; and
   releasing, when the instruction is a releasing instruction instructing releasing of the storage region, the storage region and transferring the releasing instruction to the buffer before the releasing is completed.

\* \* \* \* \*